United States Patent
Hafenrichter et al.

(10) Patent No.: US 9,687,981 B2
(45) Date of Patent: Jun. 27, 2017

(54) LOCOMOTION SYSTEM FOR ROBOTIC SNAKE

(71) Applicant: The Boeing Company, Huntington Beach, CA (US)

(72) Inventors: Joseph L. Hafenrichter, Seattle, WA (US); Gary E. Georgeson, Tacoma, WA (US); William P. Motzer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/536,802

(22) Filed: Nov. 10, 2014

(65) Prior Publication Data

US 2015/0060161 A1    Mar. 5, 2015

Related U.S. Application Data

(63) Continuation of application No. 12/940,823, filed on Nov. 5, 2010, now Pat. No. 8,899,359.

(51) Int. Cl.
| | |
|---|---|
| *B25J 5/00* | (2006.01) |
| *B25J 9/06* | (2006.01) |
| *B25J 9/16* | (2006.01) |
| *B25J 18/06* | (2006.01) |
| *B64F 5/60* | (2017.01) |

(52) U.S. Cl.
CPC ............ *B25J 5/007* (2013.01); *B25J 9/065* (2013.01); *B25J 9/1679* (2013.01); *B25J 18/06* (2013.01); *B64F 5/60* (2017.01); *Y10S 901/44* (2013.01)

(58) Field of Classification Search
CPC . B25J 5/007; B25J 9/065; B25J 9/1679; B25J 18/06; F16L 55/00
USPC .......................................... 180/7.1
See application file for complete search history.

(56) References Cited

U.S. PATENT DOCUMENTS

| | | | |
|---|---|---|---|
| 4,372,161 | A | 2/1983 | de Buda et al. |
| 4,522,129 | A | 6/1985 | Jerberyd |
| 4,862,808 | A | 9/1989 | Hedgcoxe et al. |
| 4,938,081 | A | 7/1990 | Negishi |
| 5,018,451 | A | 5/1991 | Hapstack |
| 5,080,020 | A | 1/1992 | Negishi |
| 5,142,989 | A * | 9/1992 | Suzumori et al. ......... 104/138.2 |
| 5,172,639 | A | 12/1992 | Wiesman et al. |
| 5,386,741 | A | 2/1995 | Rennex |
| 5,601,025 | A | 2/1997 | Box |
| 5,758,731 | A | 6/1998 | Zollinger |
| 5,788,002 | A | 8/1998 | Richter |

(Continued)

OTHER PUBLICATIONS

Dowling, K.; Limbless Locomotion: Learning to Crawl with a Snake Robot; The Robotics Institute Carnegie Mellon University; Dec. 1997; 150 pages.

(Continued)

*Primary Examiner* — Joseph Rocca
*Assistant Examiner* — Michael Stabley
(74) *Attorney, Agent, or Firm* — Armstong Teasdale LLP

(57) ABSTRACT

A serpentine body includes a first portion, a first wheel coupled to the first portion, a second portion, a second wheel coupled to the second portion, and at least one sensor coupled to the first portion and/or the second portion. The first wheel is rotatable in a first direction. The second wheel is rotatable in a second direction opposite the first direction when the first wheel rotates in the first direction.

7 Claims, 16 Drawing Sheets

(56) References Cited

U.S. PATENT DOCUMENTS

| | | |
|---|---|---|
| 5,791,255 A | 8/1998 | Box |
| 5,947,213 A | 9/1999 | Angle et al. |
| 6,035,786 A | 3/2000 | McKay et al. |
| 6,044,769 A * | 4/2000 | Oka et al. .................. 104/138.2 |
| 6,427,602 B1 | 8/2002 | Hovis et al. |
| 6,450,104 B1 | 9/2002 | Grant et al. |
| 6,764,441 B2 | 7/2004 | Chiel et al. |
| 6,870,343 B2 | 3/2005 | Borenstein et al. |
| 7,597,048 B2 * | 10/2009 | Nicholson .................. 104/138.2 |
| 8,201,473 B2 | 6/2012 | Knoll |
| 8,245,799 B2 | 8/2012 | Chiel et al. |
| 8,419,678 B2 | 4/2013 | Cabiri et al. |
| 2009/0086014 A1 | 4/2009 | Lea et al. |
| 2010/0234988 A1 | 9/2010 | Buckingham et al. |

OTHER PUBLICATIONS

Design of Snake Robotics; http://www.cs.edu/~biorobotics//projects/prj_snake.html; Copyright 2000 Sensor Based Planning Lab, Carnegie Mellon University; 4 pages.

Modular Snake Robots; http://cs.cmu.edu/~biorobotice/projects/modsnake/modsnkae.html; Copyright 2010 Biorobotics Lab Mellon University; 1 page.

* cited by examiner

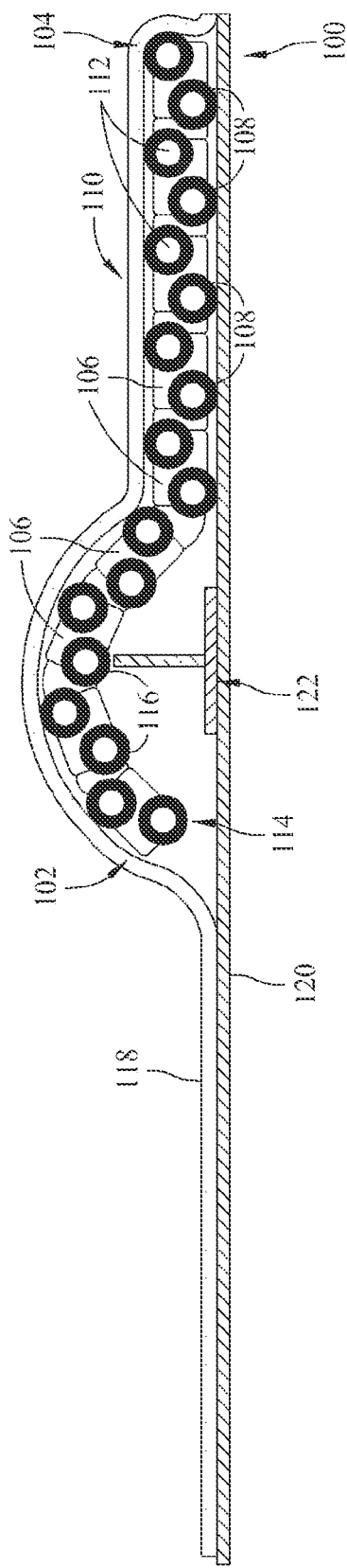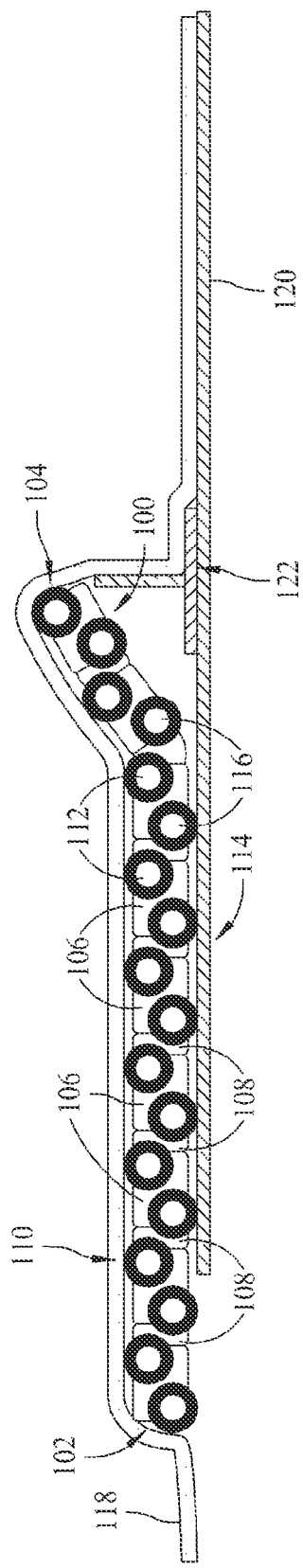

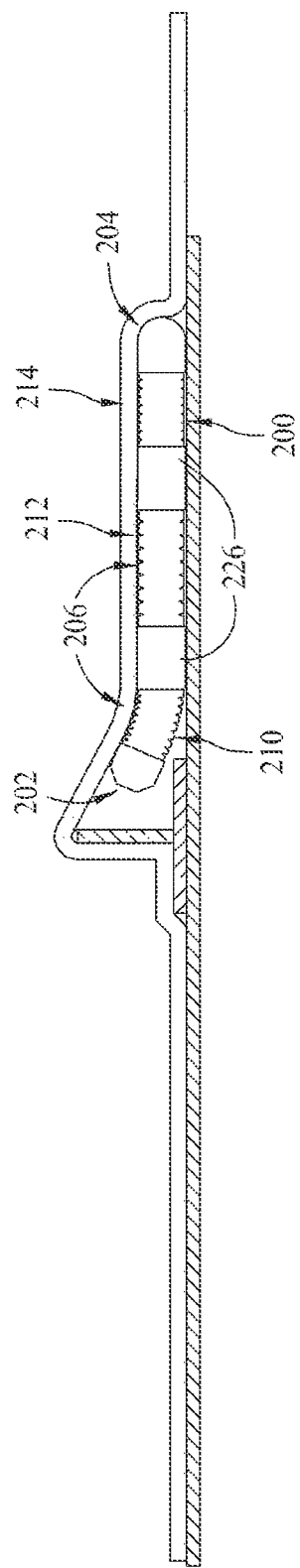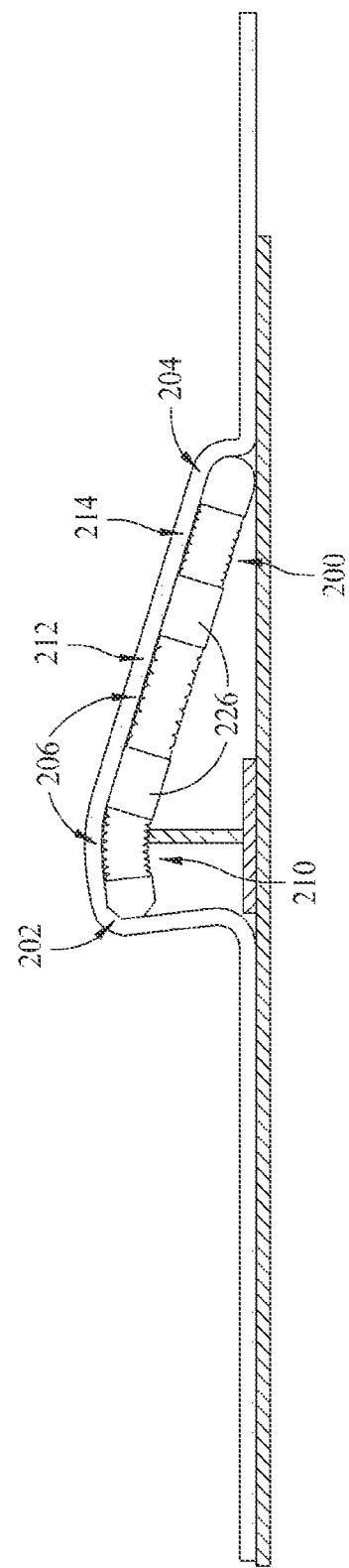

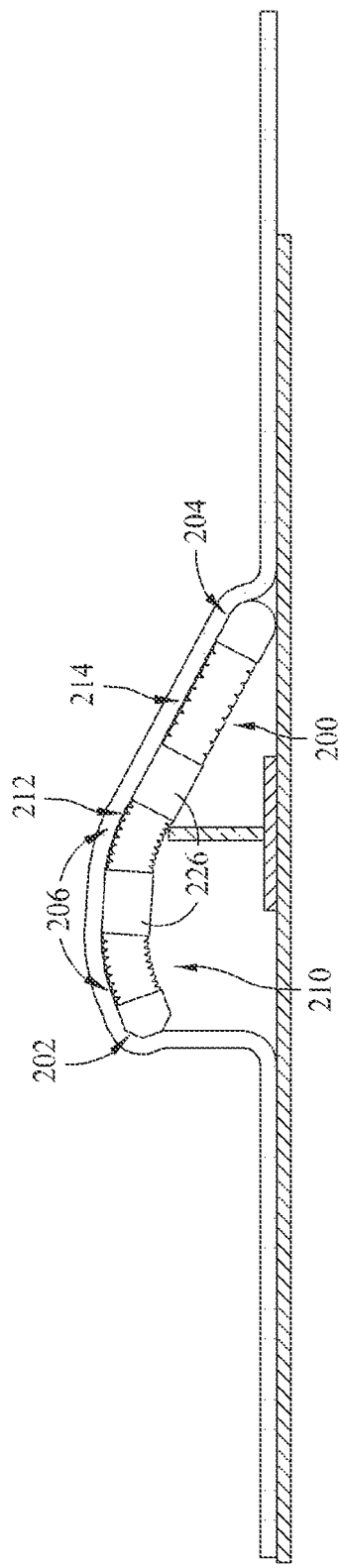
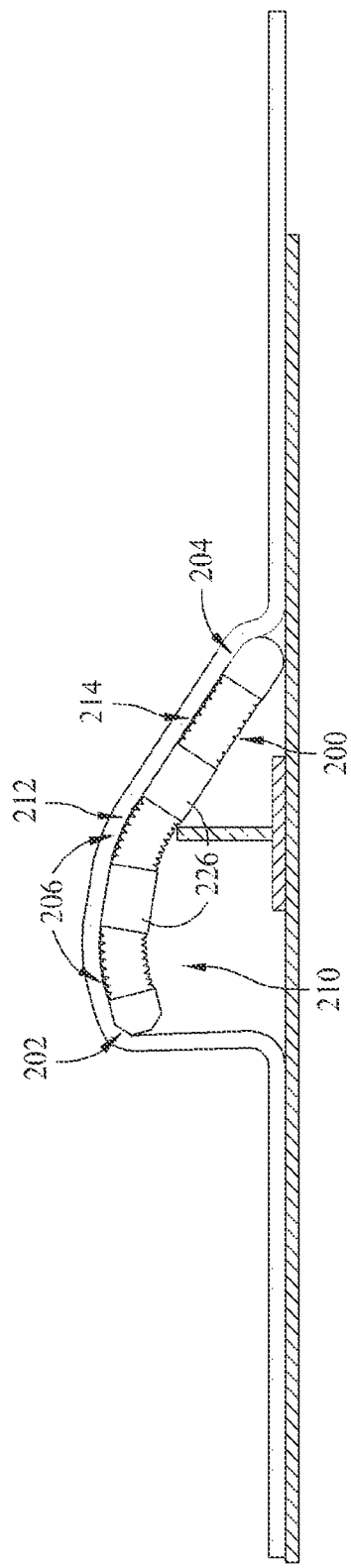
FIG. 2G
FIG. 2H

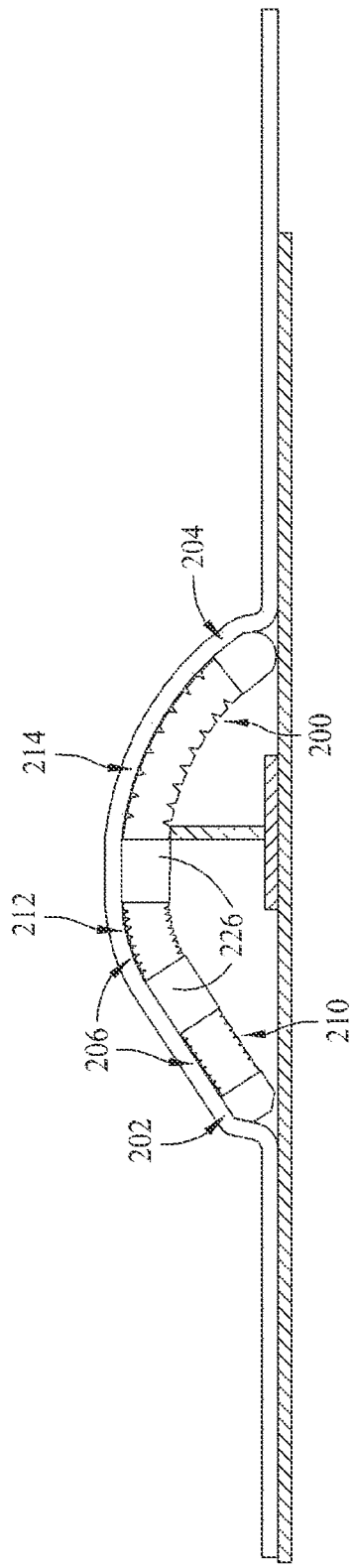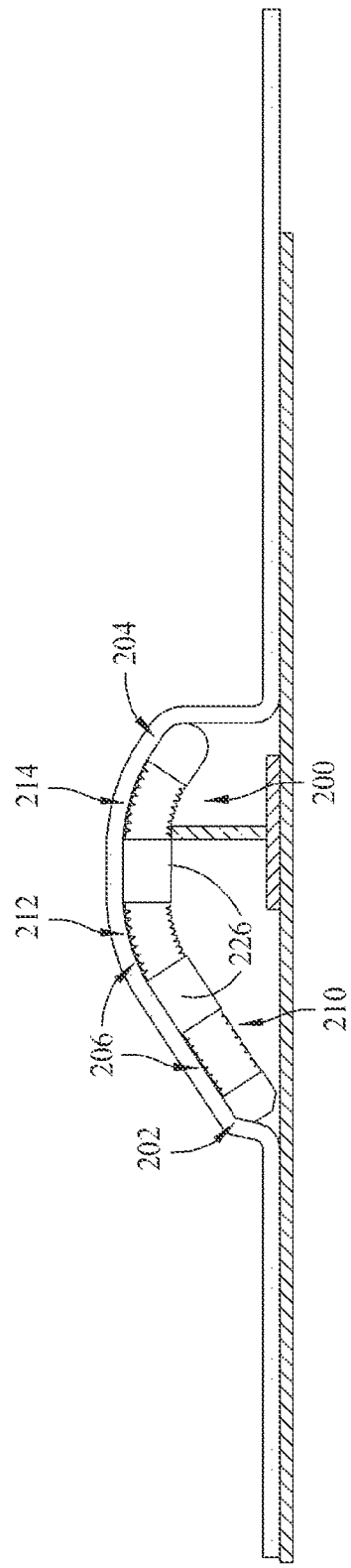

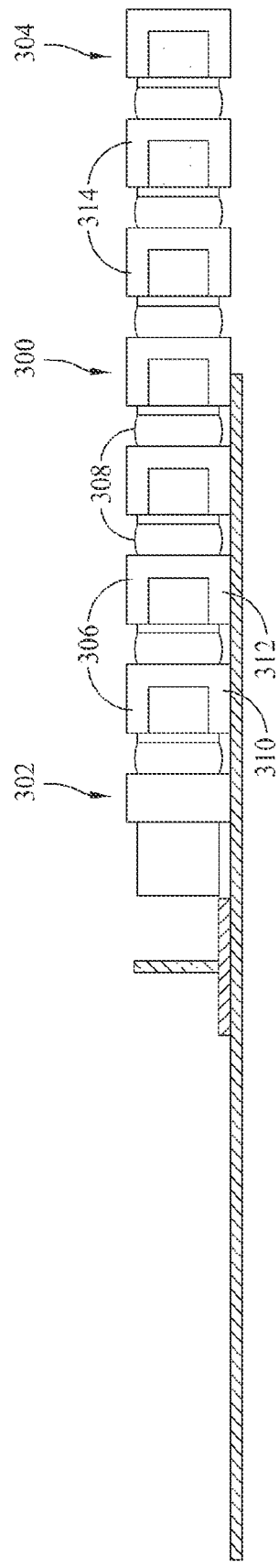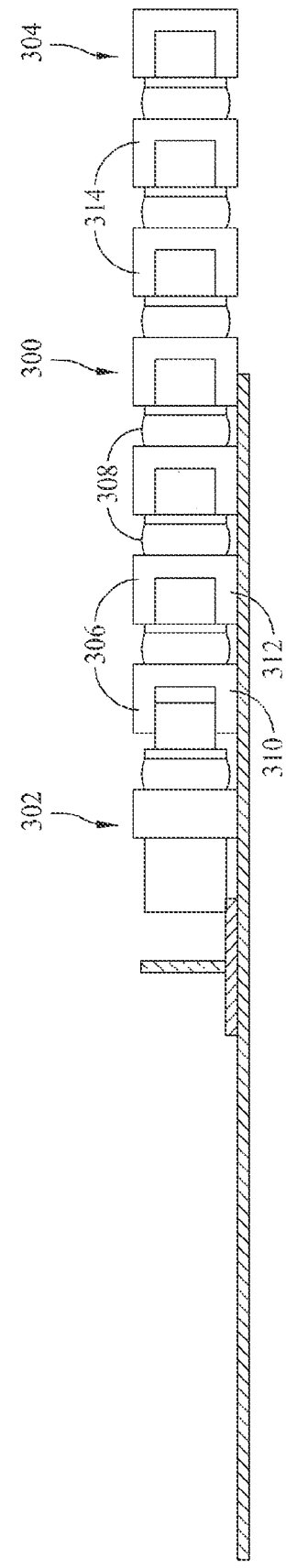
FIG. 4A
FIG. 4B

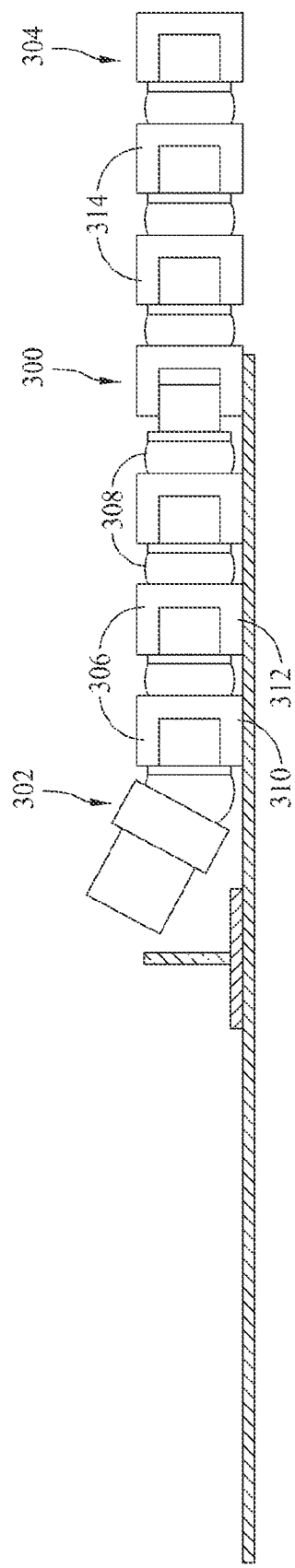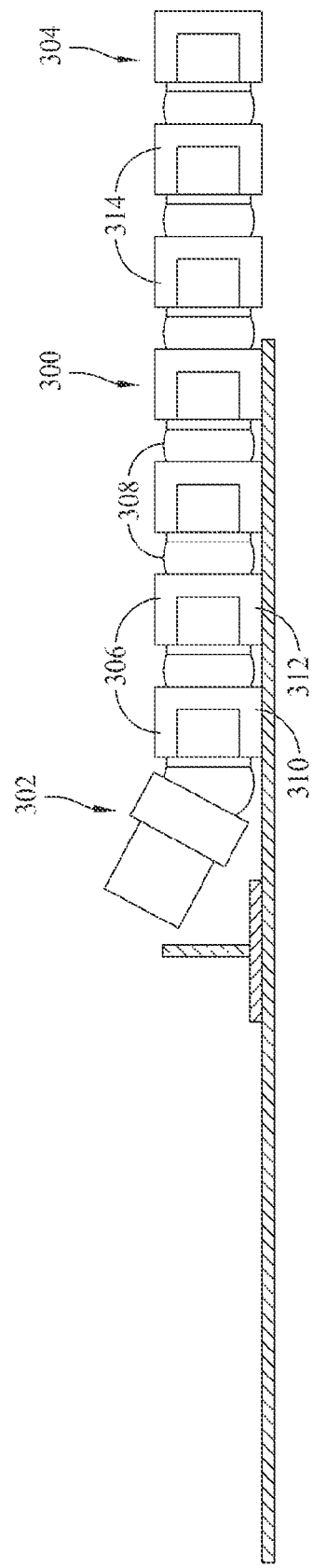
FIG. 4G
FIG. 4H

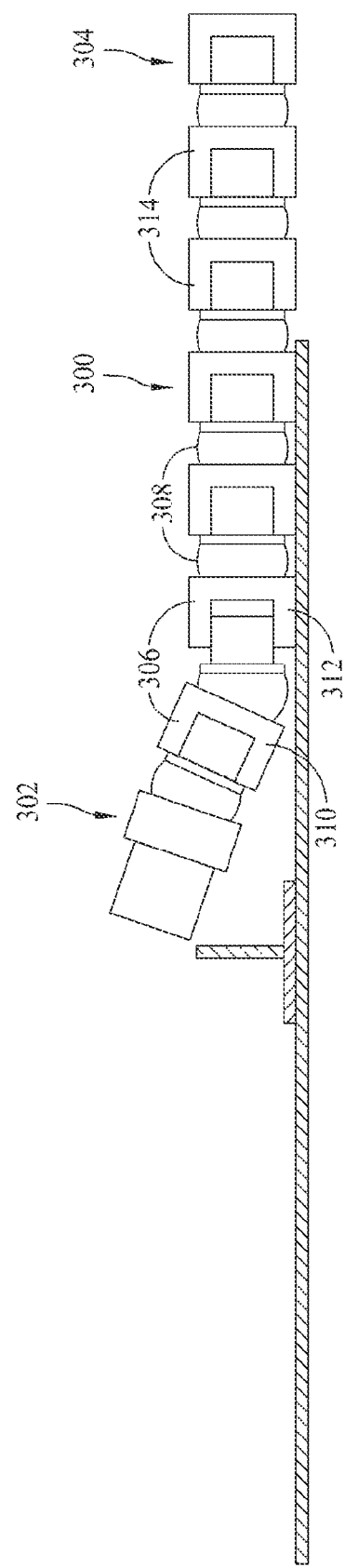

LOCOMOTION SYSTEM FOR ROBOTIC SNAKE

CROSS REFERENCE TO RELATED APPLICATIONS

This application is a continuation application of U.S. patent application Ser. No. 12/940,823, filed Nov. 5, 2010, which is incorporated herein by reference in its entirety.

BACKGROUND

The subject matter described herein relates generally to non-destructive inspection of components and, more particularly, to robotic snakes used to perform non-destructive inspections.

Known aircraft generally require routine maintenance, including scheduled inspections and/or repair of various components. As a result, structural health monitoring, including scheduled and detailed inspections, including non-destructive inspections, of aircraft components is a growing field. At least some known structural health monitoring systems use a robotic snake to facilitate the inspection of components. However, because of various spatial restrictions physical and/or visual access to at least some components may be relatively difficult. For example, a fuel bladder and/or an insulation blanket may restrict access to the component to be inspected and cause drag and/or otherwise impede movement of the robotic snake. As such, the use of robotic snakes in such inspections may be limited.

BRIEF DESCRIPTION

In one aspect, a method is provided for traversing an area with a serpentine body including a first portion and a second portion. The method includes orienting the serpentine body in a desired direction, rotating at least a first wheel in a first direction, and rotating at least a second wheel in a second direction opposite the first direction. The first portion and/or the second portion is coupled to at least one sensor. The first wheel is coupled to the first portion. The second wheel is coupled to the second portion.

In another aspect, a serpentine body is provided. The serpentine body includes a first portion, a first wheel coupled to the first portion, a second portion, a second wheel coupled to the second portion, and at least one sensor coupled to the first portion and/or the second portion. The first wheel is rotatable in a first direction. The second wheel is rotatable in a second direction opposite the first direction when the first wheel rotates in the first direction.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIGS. 1A-1E are sequential time-lapse illustrations of an exemplary robotic snake performing maintenance of a component;

FIGS. 2A-2J are sequential time-lapse illustrations of another exemplary robotic snake performing maintenance of a component;

FIGS. 4A-4I are sequential time-lapse illustrations of a further exemplary robotic snake performing maintenance of a component.

DETAILED DESCRIPTION

Figure 1A:
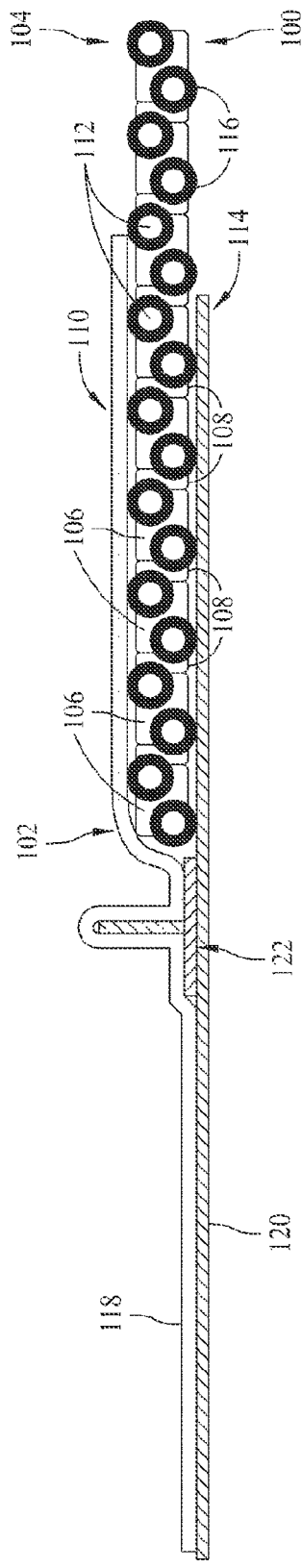

The subject matter described herein relates generally to locomotion systems that enable a serpentine body or, more particularly, a robotic snake to travel through a limited access area. More specifically, the locomotion systems described herein enable moving the serpentine body between a flexible object, such as a fuel bladder or an insulation blanket, and a solid structure. In one embodiment, the robotic snake includes a front end, a back end, and a plurality of interlocked portions extending therebetween. The front end is positionable in a desired direction, and a first portion positioned downstream from the front end may be actuated to be in a first configuration. Similarly, a second portion positioned downstream from the first portion may be actuated to be in a second configuration to facilitate propelling the robotic snake in the desired direction.

An exemplary technical effect of the methods and systems described herein includes at least one of (a) positioning a front end of the serpentine body in a desired direction; (b) actuating a first portion of the serpentine body to be in a first configuration; (c) actuating a second portion of the serpentine body to be in a second configuration; (d) generating friction proximate to one of a segment of the serpentine body; (e) propelling the serpentine body in the desired direction; and (f) burrowing at least a portion of the serpentine body under a flexible object covering a portion of the area.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

FIGS. 1A-1E illustrate an exemplary robotic snake 100 that may be used to inspect, evaluate, maintain, and/or repair an object or a component (not shown). In the exemplary embodiment, robotic snake 100 is capable of an "inchworm-type" of locomotion.

In the exemplary embodiment, robotic snake 100 includes a front end 102 and a back end 104 opposite front end 102. In the exemplary embodiment, front end 102 is navigable in a desired direction. More specifically, in the exemplary embodiment, robotic snake 100 includes a plurality of interlocked segments 106 that are coupled together via a plurality of joints 108 that enable robotic snake 100 to be selectively positioned in various directions.

In the exemplary embodiment, an upper or first portion 110 is positioned between front end 102 and back end 104. More specifically, first portion 110 is positioned downstream of first end 102. In the exemplary embodiment, upper portion 110 includes a plurality of first wheels 112 that are rotatably coupled to robotic snake 100. More particularly, in the exemplary embodiment, each segment 106 includes at least one first wheel 112 coupled thereto. Alternatively, every other segment 106 includes at least one first wheel 112. In another embodiment, each segment 106 includes a pair of first wheels 112 positioned on opposite sides of segment 106. Each segment 106 may be coupled to any number of first wheels 112 that enable robotic snake 100 to function as described herein.

Moreover, in the exemplary embodiment, a lower or second portion 114 is positioned between front end 102 and back end 104. More specifically, second portion 114 is positioned downstream of first portion 110. In the exemplary embodiment, lower portion 114 includes a plurality of second wheels 116 that are rotatably coupled to robotic snake 100. More particularly, in the exemplary embodiment, each segment 106 includes at least one second wheel 116 coupled thereto. Alternatively, every other segment 106 includes at least one second wheel 116. In another embodiment, each segment 106 includes a pair of second wheels 116 positioned on opposite sides of segment 106. Each segment 106 may be coupled to any number of second wheels 116 that enable robotic snake 100 to function as described herein.

In the exemplary embodiment, wheels 112 and 116 may selectively alternate between a first configuration and a second configuration. In the exemplary embodiment, first and second wheels 112 and 116 rotate in opposite directions to enable robotic snake 100 to be propelled in a desired direction. In the exemplary embodiment, each segment 106 includes at least one motor (not shown) for use in rotating wheel 112 and/or wheel 116. Alternatively, robotic snake 100 may include a double-track system (not shown) that includes a plurality of first and second wheels 116 coupled to the same motor. In the exemplary embodiment, wheels 116 rotate in an opposite direction to wheels 112 to enable robotic snake 100 to traverse under a flexible object 118 such as, without limitation, a fuel bladder or an insulation blanket.

During operation of robotic snake 100, in the exemplary embodiment, first wheels 112 are in the first configuration and second wheels 116 are in the second configuration to enable robotic snake 100 to move under flexible object 118. More specifically, in the exemplary embodiment, first wheels 112 rotate in a clockwise direction to propel robotic snake 100 with respect to flexible object 118, and second wheels 116 rotate in a counterclockwise direction to propel robotic snake 100 with respect to a solid structure 120 positioned below robotic snake 100.

Figure 1B:
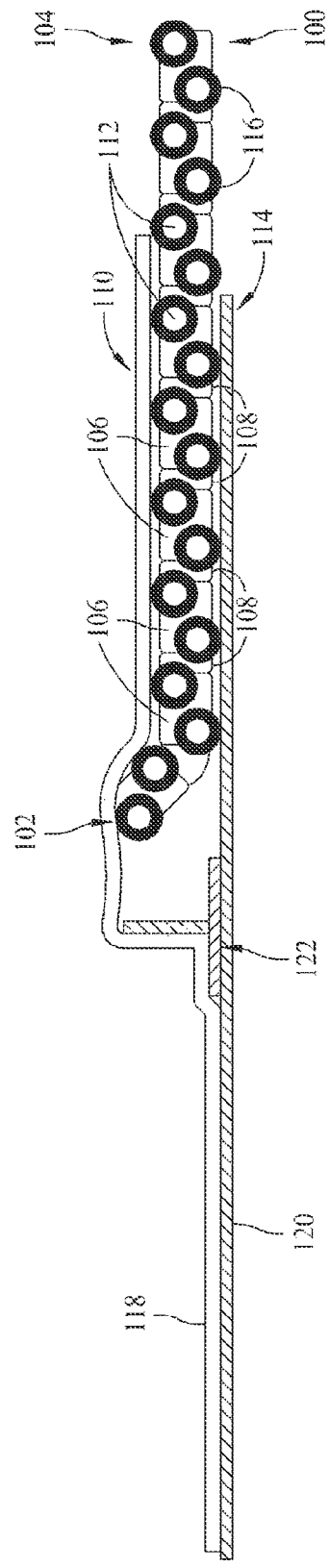
Figure 1E:
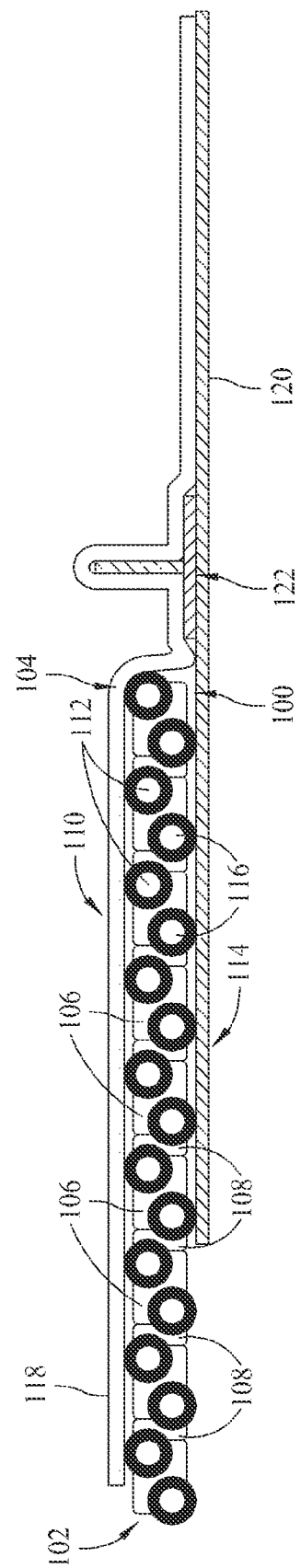
Figure 2C:
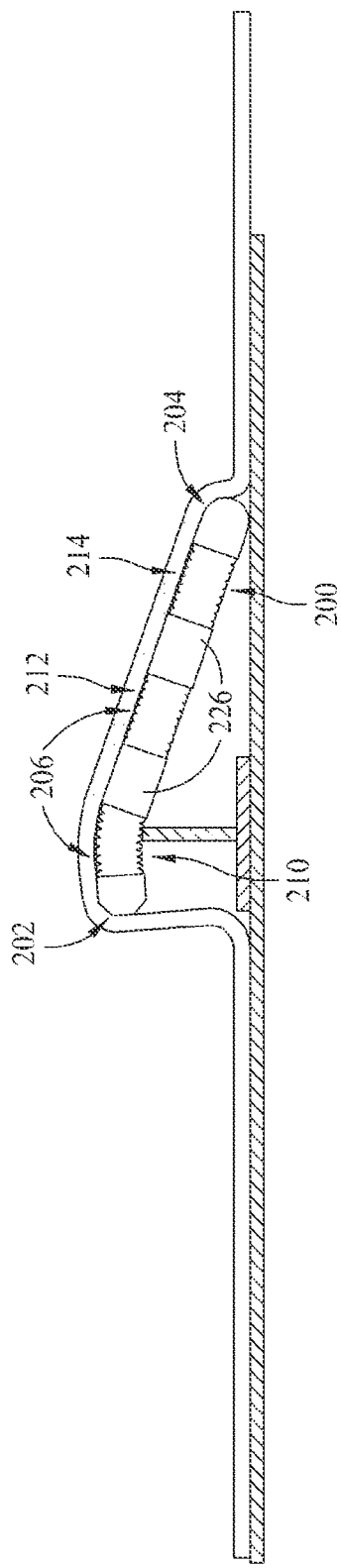
Figure 2D:
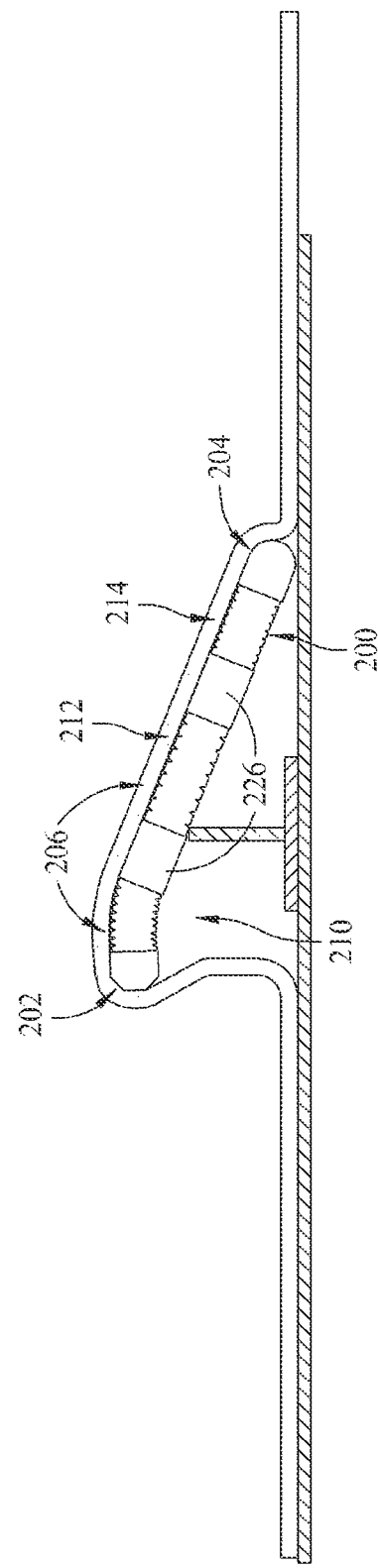
Figure 2E:
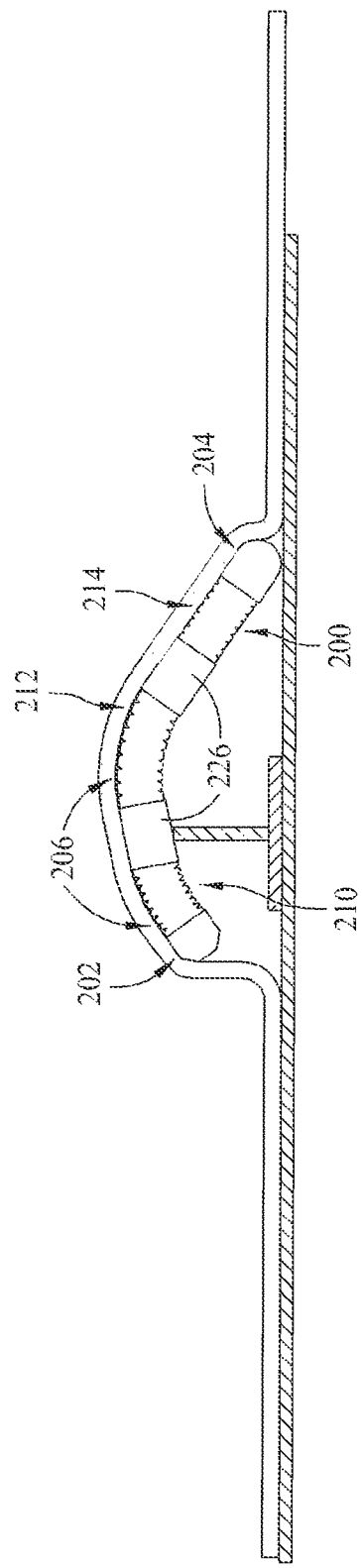
Figure 2F:
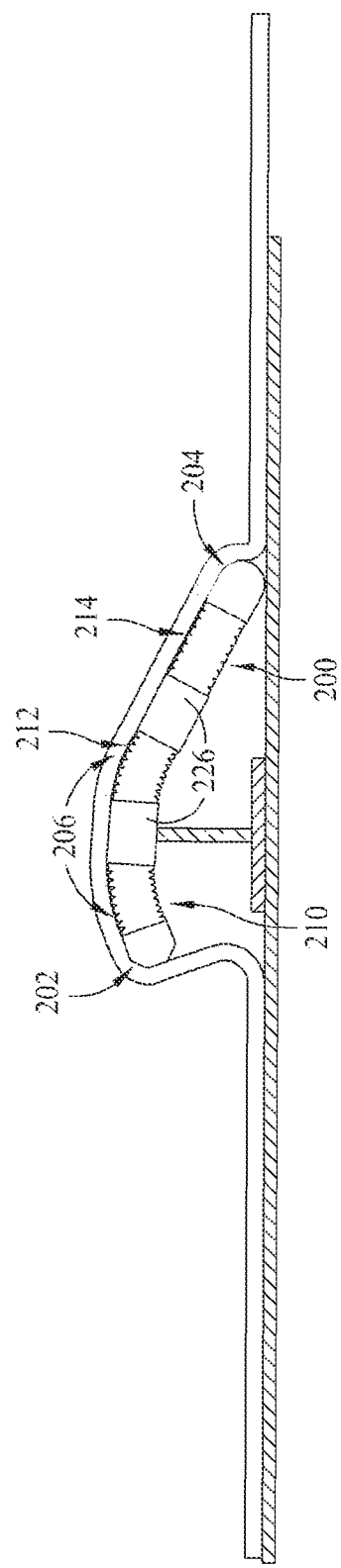

When, in the exemplary embodiment, front end 102 approaches an obstacle 122 such as, without limitation, a stiffener, front end 102 can be elevated, as shown in FIG. 1B, to enable the remainder of robotic snake 100, including back end 104 to follow front end 102 over obstacle 122, as shown in FIGS. 1C and 1D. In the exemplary embodiment, obstacle 122 is positioned under flexible object 118 and above structure 120. In the exemplary embodiment, at least one joint 108 selectively positions at least one segment 106 to enable robotic snake 100 to be positioned in a desired direction.

FIGS. 2A-2J and 3A-3C illustrate another exemplary robotic snake 200 that may be used to inspect, evaluate, maintain, and/or repair an object or a component (not shown). In the exemplary embodiment, robotic snake 200 is a pneumatic system that is capable of a "nightcrawler-type" of locomotion.

Figure 3A:
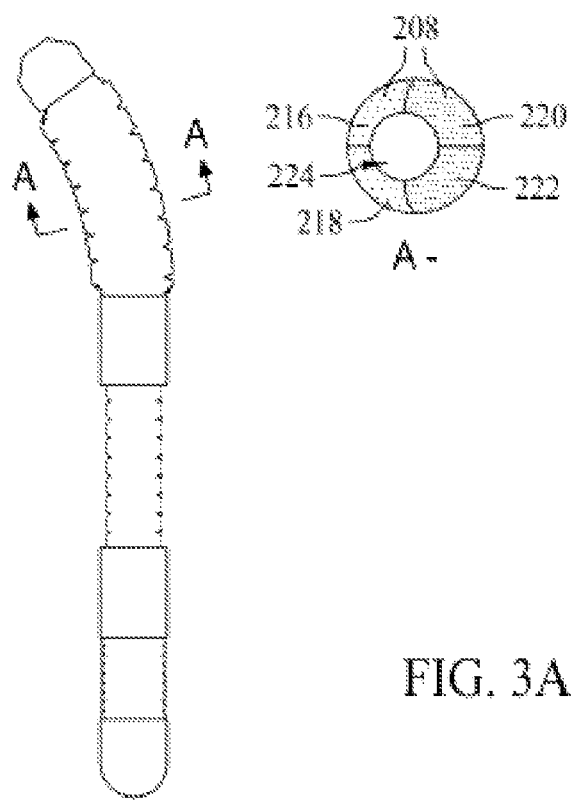
FIGS. 3A-3C are top view illustrations of the robotic snake shown in FIGS. 2A-2J.
Figure 3B:
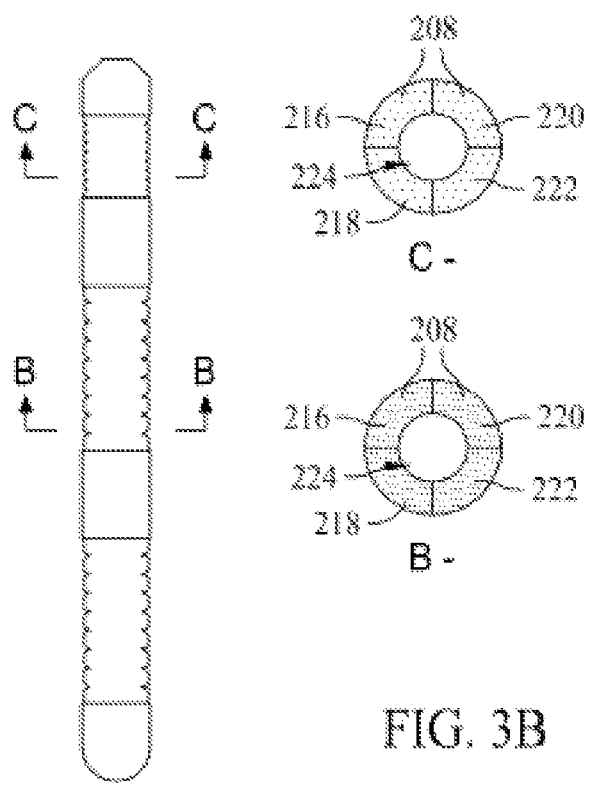
Figure 3C:
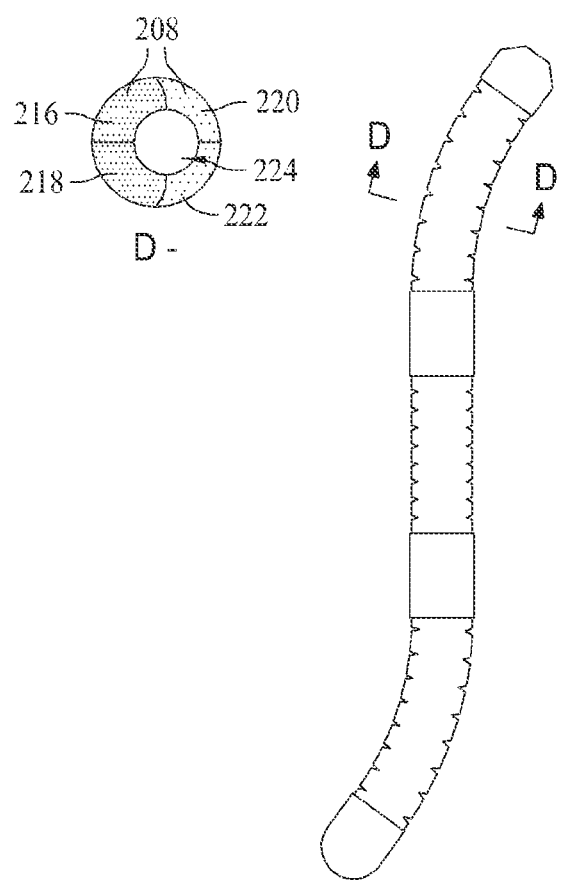

In the exemplary embodiment, robotic snake 200 includes a front end 202 and a back end 204 that is opposite front end 202. In the exemplary embodiment, a plurality of segments 206 that house a plurality of internal bladders 208, shown in FIGS. 3A-3C, are positioned between front end 202 and back end 204. Moreover, in the exemplary embodiment, bladders 208 are selectively variable between a first configuration and a second configuration to enable robotic snake 200 to be selectively positioned in various directions. More specifically, in the exemplary embodiment, bladders 208 may each be pressurized and/or depressurized to dynamically control a radial shape and/or an axial length of each segment 206 between a contracted configuration and an expanded configuration.

In the exemplary embodiment, bladders 208 are housed within a first portion or lead segment 210, a second portion or middle segment 212, and a third portion or rear segment 214. In the exemplary embodiment, each segment 210, 212, and 214 includes internal bladders 208 positioned at an upper left quadrant 216, a lower left quadrant 218, an upper right quadrant 220, and/or a lower right quadrant 222, shown in FIGS. 3A-3C. Alternatively, robotic snake 200 may include any suitable quantity of segments, and each segment 210, 212, and 214 may include any suitable quantity of internal bladders 208 that enable robotic snake 200 to function as described herein.

As shown in FIGS. 3A-3C, an airline 224 extends axially through robotic snake 200. In the exemplary embodiment, a valve (not shown) communicatively couples airline 224 to each internal bladder 208 to enable at least one internal bladder 208 to be selectively pressurized and/or depressurized, as described in more detail below. In one embodiment, airline 224 includes a vacuum line (not shown) that enables forceful contractions of at least one internal bladder 208. Robotic snake 200 may include any suitable quantity of airlines disposed at any positioned within robotic snake 200 that enable robotic snake 200 to function as described herein.

In the exemplary embodiment, robotic snake 200 includes at least one friction mechanism 226 that enables robotic snake 200 to move with respect to flexible object 118, solid structure 120, and/or obstacle 122. More specifically, in the exemplary embodiment, friction mechanism 226 maintains a relative position of a first portion of robotic snake 200 with respect to flexible object 118, solid structure 120, and/or obstacle 122, such that a second portion of robotic snake 200 is movable with respect to flexible object 118, solid structure 120, and/or obstacle 122. In the exemplary embodiment, friction mechanism 226 is positioned between adjacent segments 210, 212, and 214. In one embodiment, friction mechanism 226 includes a plurality of cilia, scales and/or hair disposed on an outer surface of robotic snake 200. If oriented to point substantially toward back end 204, for example, such cilia, scales, and/or hair would enable robotic snake 200 to move forward while restricting backward motion.

Additionally or alternatively, robotic snake 200 may include a plurality of valves that are configured to release compressed air to enable robotic snake 200 to reduce friction proximate to the valves. More specifically, in such an embodiment, the valves would release compressed air in a radially outward direction to create a distance between robotic snake 200 and flexible object 118, solid structure 120, and/or obstacle 122. Additionally or alternatively, robotic snake 200 may include a plurality of actuators that vibrate to enable robotic snake 200 to reduce friction proximate to the actuators. More specifically, in such an embodiment, the actuators would vibrate to create a distance between robotic snake 200 and flexible object 118, solid structure 120, and/or obstacle 122.

During operation of robotic snake 200, in the exemplary embodiment, internal bladders 208 systematically alternate between the contracted configuration and the expanded configuration to enable robotic snake 200 to move in a desired direction. Moreover, in the exemplary embodiment, internal bladders 208 positioned within quadrants 216, 218, 220, and/or 222 are systematically actuated to the contracted configuration or the expanded configuration to enable robotic snake 200 to be navigated and/or steered in a desired direction.

For example, in the exemplary embodiment, lead segment 210 is in the first configuration and middle segment 212 is in the second configuration to enable robotic snake 200 to move under flexible object 118. More specifically, in the exemplary embodiment, lead segment 210 expands to move robotic snake 200 in a forward direction, and contracts to pull back end 204 toward the forward direction. Moreover, in the exemplary embodiment, middle segment 212 expands to enable lead segment 210 to contract, and contracts to pull back end 204 toward the forward direction. Further, in the exemplary embodiment, rear segment 214 expands to enable middle segment 212 to contract, and contracts to pull back end 204 toward the forward direction. As such, in the exemplary embodiment, segments 210, 212, and 214 cooperate to move robotic snake 200 in a forward direction.

Moreover, in the exemplary embodiment, quadrants 216, 218, 220, and 222 may be selectively expanded and/or contracted to turn segment 210, 212, and/or 214 in a desired direction. For example, in the exemplary embodiment, upper quadrants 216 and 220 are contracted and lower quadrants 218 and 222 are expanded to turn segment 210, 212, and/or 214 in an upward direction. Moreover, in the exemplary embodiment, upper quadrants 216 and 220 are expanded and lower quadrants 218 and 22 are contracted to turn segment 210, 212, and/or 214 in a downward direction. Further, as shown in FIG. 3A, left quadrants 216 and 218 are contracted and right quadrants 220 and 222 are expanded to turn segment 210, 212, and/or 214 left, and, as shown in FIG. 3C, left quadrants 216 and 218 are expanded and right quadrants 220 and 222 are contracted to run segment 210, 212, and/or 214 right. Additionally, quadrants 216, 218, 220, and/or 222 may be expanded and/or contracted in an axial and/or radial direction to enable robotic snake 200 to move in a desired direction.

FIGS. 4A-4I illustrate yet another exemplary robotic snake 300 that may be used to inspect, evaluate, maintain, and/or repair an object or a component (not shown). In the exemplary embodiment, robotic snake 300 is a mechanical system that is capable of a "nightcrawler-type" of locomotion.

In the exemplary embodiment, robotic snake 300 includes a front end 302 and a back end 304 opposite front end 302. In the exemplary embodiment, front end 302 is positionable in a desired direction. More specifically, in the exemplary embodiment, robotic snake 300 includes a plurality of segments 306 that are coupled together via a plurality of joints 308 to enable robotic snake 300 to be selectively positioned in various directions. In the exemplary embodiment, segments 306 include, for example, a first portion or segment 310 and a second portion or segment 312. Robotic snake 300 may include any suitable quantity of segments that enable robotic snake 300 to function as described herein.

In the exemplary embodiment, each segment 306 is configured to alternate between a first configuration and a second configuration to enable moving robotic snake 300 in a desired direction. More specifically, in the exemplary embodiment, each segment 306 includes a solenoid (not shown) configured to alternate between a contracted configuration and an expanded configuration.

In the exemplary embodiment, robotic snake 300 includes at least one friction mechanism 314 that enables robotic snake 300 to move with respect to flexible object 118, solid structure 120, and/or obstacle 122. More specifically, in the exemplary embodiment, friction mechanism 314 enables a first portion of robotic snake 300 to maintain a position with respect to flexible object 118, solid structure 120, and/or obstacle 122, such that a second portion of robotic snake 300 is movable with respect to flexible object 118, solid structure 120, and/or obstacle 122. In the exemplary embodiment, friction mechanism 314 is positioned between adjacent each segment 306. In one embodiment, friction mechanism 314 includes a plurality of cilia, scales and/or hair disposed on an outer surface of robotic snake 300. If oriented to point substantially toward back end 304, for example, such cilia, scales, and/or hair would enable robotic snake 300 to move forward while restricting backward motion.

Additionally or alternatively, robotic snake 300 may include a plurality of valves that are configured to release compressed air to enable robotic snake 300 to reduce friction proximate to the valves. More specifically, in such an embodiment, the valves would release compressed air in a radially outward direction to create a distance between robotic snake 300 and flexible object 118, solid structure 120, and/or obstacle 122. Additionally or alternatively, robotic snake 300 may include a plurality of actuators that vibrate to enable robotic snake 300 to reduce friction proximate to the actuators. More specifically, in such an embodiment, the actuators would vibrate to create a distance between robotic snake 300 and flexible object 118, solid structure 120, and/or obstacle 122.

During operation of robotic snake 300, in the exemplary embodiment, segments 306 systematically alternate between the contracted configuration and the expanded configuration to enable robotic snake 300 to move in a desired direction. For example, in the exemplary embodiment, first segment 310 expands to move robotic snake 300 in a forward direction, and contracts to pull back end 304 toward the forward direction. Moreover, in the exemplary embodiment, second segment 312 expands to enable first segment 310 to contract, and contracts to pull back end 304 toward the forward direction. As such, in the exemplary embodiment, segments 306 cooperate to move robotic snake 300 in a forward direction.

Figure 4C:
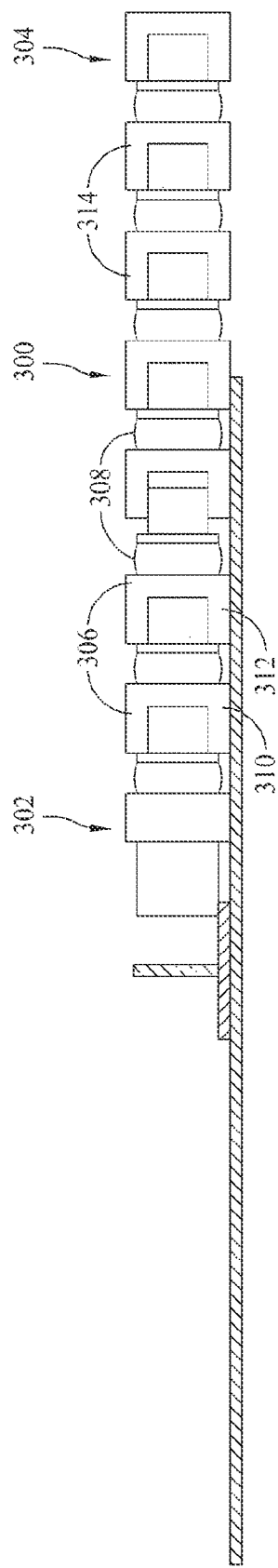
Figure 4D:
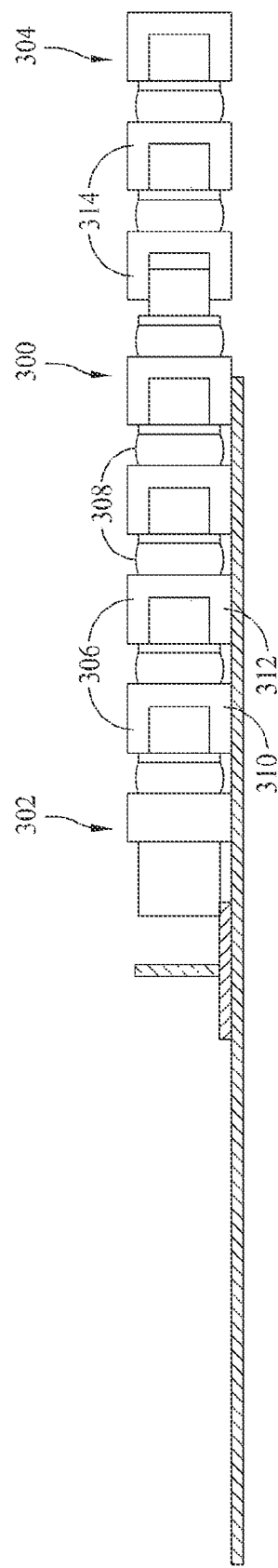
Figure 4E:
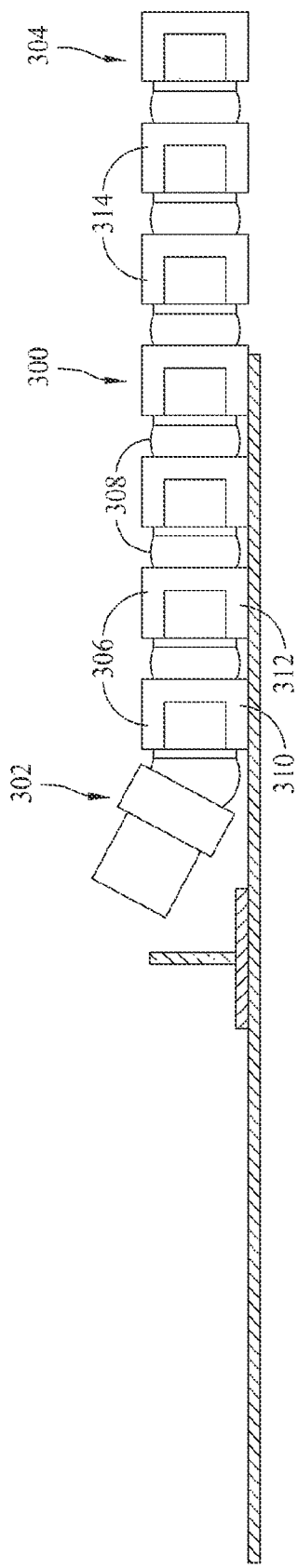
Figure 4F:
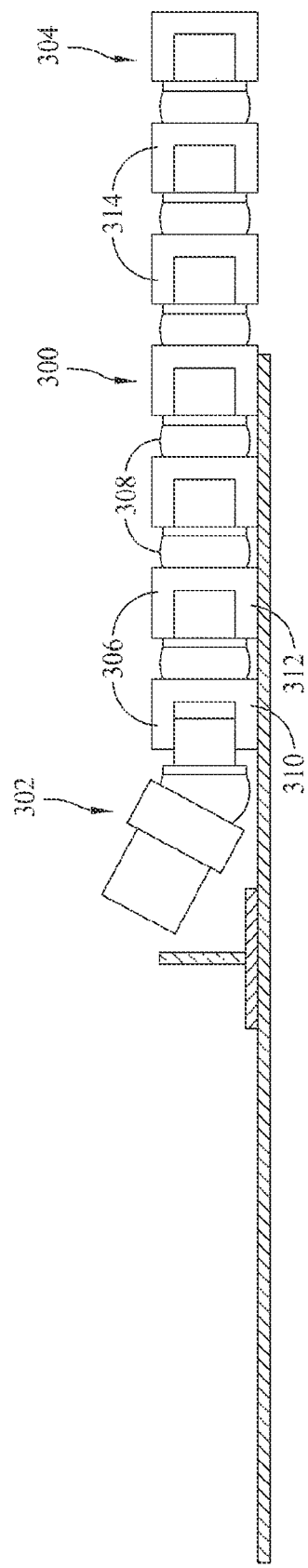

When front end 302 approaches obstacle 122, in the exemplary embodiment, front end 302 is elevated, as shown in FIG. 4E, and the remainder of robotic snake 300, including back end 304, follows front end 302 over obstacle 122. In the exemplary embodiment, at least one joint 308 is configured to selectively position at least one segment 306 to position robotic snake 300 in a desired direction.

In one embodiment, at least one sensor (not shown) may be coupled to robotic snake 100, 200, and/or 300. In such an embodiment, the sensor provides positional data relevant to robotic snake 100, 200, and/or 300. For example, the sensor may be, without limitation, being a camera, an optical sensor, an infrared sensor, a local positioning system sensor, an accelerometer, a gyroscope, an automated movement sensor, a chemical sensor, and/or a nondestructive evaluation sensor.

Moreover, in another embodiment, at least one tool (not shown) may be coupled to robotic snake 100, 200, and/or 300. In such an embodiment, the tool enables robotic snake 100, 200, and/or 300 to navigate. For example, the tool may be, without limitation, a drill, a cutting tool, and/or a scaling tool such as a suction cup. Moreover, the tool may be a burrowing mechanism (not shown) positioned proximate to front end 102, 202, and/or 302 that enables robotic snake 100, 200, and/or 300, respectively, to burrow under flexible object 118. Such borrowing mechanisms may include, without limitation, an auger-type tool, a double-track tool (i.e., to enable movement in opposite directions), a badger-mechanism, and a flat head tool.

Further, in yet another embodiment, a skin (not shown) may extend over and define an outer surface of robotic snake 100, 200, and/or 300. In such an embodiment, the skin is fabricated from a material that is suitable to provide protection, compliance, flexibility, and/or resilience to robotic snake 100, 200, and/or 300. Additionally, the skin may provide robotic snake 100, 200, and/or 300 with a suitable level of friction that enables robotic snake 100, 200, and/or 300 to move with respect to flexible object 118, solid structure 120, and/or obstacle 122. In at least some embodiments, the skin may provide robotic snake 100, 200, and/or 300 with a level of buoyancy that enables robotic snake 100, 200, and/or 300 to operate in an aquatic, wet, and/or damp environment.

Figure 5:
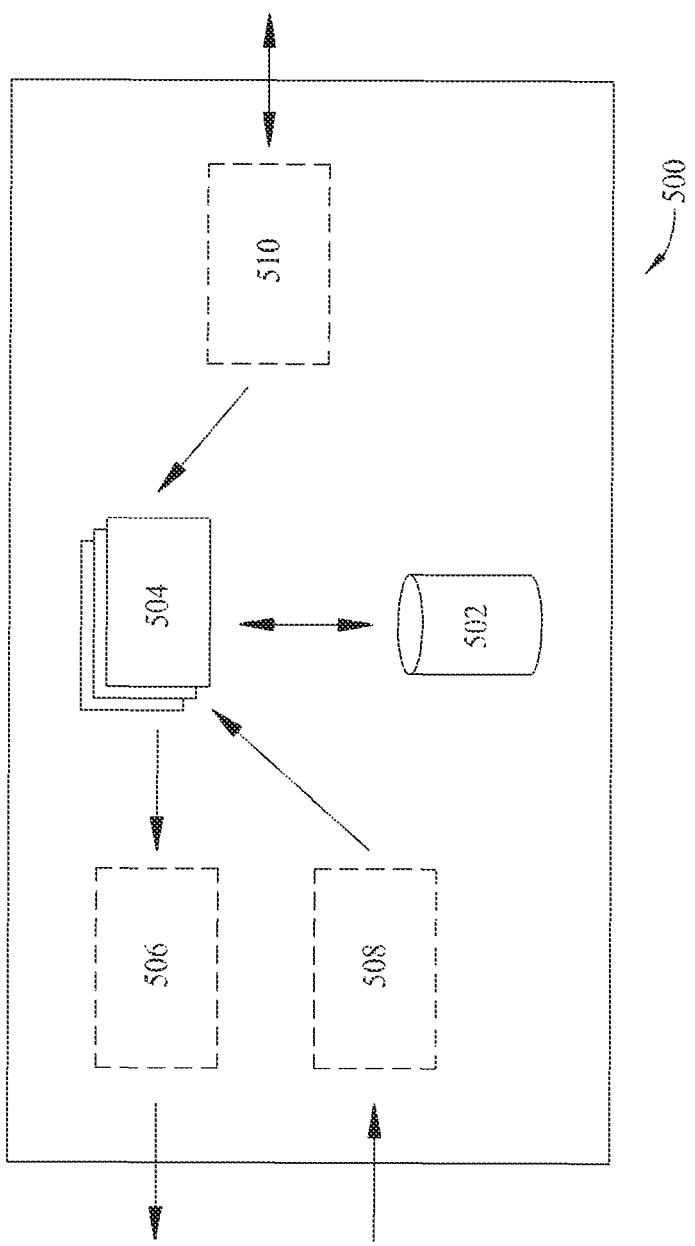
FIG. 5 is an illustration of an exemplary control system that may be used with the robotic snakes shown in FIGS. 1A-4I.

FIG. 5 illustrates an exemplary control system 500 that may be used with robotic snake 100, 200, and/or 300. In the exemplary embodiment, control system 500 is communicatively coupled to robotic snake 100, 200, and/or 300 wirelessly. Alternatively, control system 500 may be communicatively coupled to robotic snake 100, 200, and/or 300 by a tangible cable and/or cord. In the exemplary embodiment, control system 500 includes a memory device 502 and a processor 504 coupled to memory device 502 for executing instructions. In some embodiments, executable instructions are stored in memory device 502. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits.

Control system 500 is configurable to perform one or more operations described herein by programming processor 504. For example, processor 504 may be programmed by encoding an operation as one or more executable instructions and by providing the executable instructions in memory device 502. Processor 504 may include one or more processing units (e.g., in a multi-core configuration).

Memory device 502 includes one or more devices that enable information, such as executable instructions and/or other data, to be selectively stored and retrieved. Memory device 502 may include one or more computer readable media, such as, without limitation, dynamic random access memory (DRAM), static random access memory (SRAM), a solid state disk, and/or a hard disk. Moreover, memory device 502 may be configured to store, without limitation, executable instructions and/or any other type of data.

During use, control system 500 facilitates navigating robotic snake 100, 200, and/or 300 to enable inspection, evaluation, maintenance, and/or repair of a component. More specifically, control system 500 is programmable and/or is programmed to selectively actuate, position, and/or orient robotic snake 100, 200, and/or 300 relative to the component. Control of robotic snake 100, 200, and/or 300 may range anywhere from being fully autonomous to being completely user-guided.

In one embodiment, control system 500 is programmable and/or is programmed to move robotic snake 100, 200, and/or 300 based on a topological decomposition of the three-dimensional space being traversed by robotic snake 100, 200, and/or 300. For example, control system 500 may determine a position of robotic snake 100, 200, and/or 300 relative to the component. A motion planning algorithm may be developed based at least in part on the topological decomposition of the three-dimensional space and/or the position of robotic snake 100, 200, and/or 300.

In the exemplary embodiment, control system 500 includes a presentation interface 506 that is coupled to processor 504 to enable information to be presented to a user. For example, presentation interface 506 may include a display adapter (not shown) that is coupleable to a display device (not shown), such as a cathode ray tube (CRT), a liquid crystal display (LCD), an organic LED (OLED) display, and/or an "electronic ink" display. In some embodiments, presentation interface 506 includes one or more display devices. In addition to, or in the alternative, presentation interface 506 may be coupled to, and/or include, a printer.

In the exemplary embodiment, control system 500 includes an input interface 508 that receives input from a user. For example, input interface 508 receives information suitable for use with the methods described herein. Input interface 508 is coupled to processor 504 and may include, for example, a keyboard, a pointing device, a mouse, a stylus, a touch sensitive panel (e.g., a touch pad or a touch screen), and/or a position detector. It should be noted that a single component, for example, a touch screen, may function as both a display device of presentation interface 506 and as an input interface 508.

In the exemplary embodiment, control system 500 includes a communication interface 510 coupled to processor 504. In the exemplary embodiment, communication interface 510 communicates with a remote device, such as robotic snake 100, 200, 300 and/or another control system 500. More specifically, in the exemplary embodiment, control system 500 cooperates with presentation interface 506 and/or input interface 508, to enable a user to remotely operate robotic snake 100, 200, and/or 300. For example, communication interface 510 may include, without limitation, a wired network adapter, a wireless network adapter, and/or a mobile telecommunications adapter. Alternatively, or additionally, control system 500 may be coupled to robotic snake 100, 200, 300 and/or another control system 500 via a network (not shown). Such a network may include, without limitation, the Internet, a local area network (LAN), a wide area network (WAN), a wireless LAN (WLAN), a mesh network, and/or a virtual private network (VPN) or other suitable communication means. In the exemplary embodiment, control system 500 is electrically coupled directly to, and/or formed integrally with, robotic snake 100, 200, and/or 300. In one embodiment, a plurality of robotic snakes 100, 200, and/or 300 communicate with each other to facilitate an evaluation and/or maintenance of the component in an expedited manner.

The embodiments described herein provide locomotion systems that enable robotic snakes to traverse a limited access area. More specifically, such locomotion systems facilitate propelling a robotic snake under a flexible object, such as a fuel bladder and/or an insulation blanket, and make objects positioned under the flexible object accessible. As such, the use of such locomotion systems facilitates reducing a time and/or a cost associated with maintaining an object. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for traversing an area under a flexible object with a serpentine body including a first portion and a second portion, said method comprising:
    orienting a front end of the serpentine body in a desired direction, at least one of the first portion and the second portion coupled to at least one positional sensor;
    rotating at least a first wheel in a first direction using at least one motor coupled to the first wheel, wherein the rotating of the first wheel causes movement of the serpentine body, the first wheel coupled to the first portion;
    rotating at least a second wheel in a second direction opposite the first direction using at least one motor coupled to the second wheel, wherein the rotating of the second wheel causes movement of the serpentine body, the second wheel coupled to the second portion;
    providing, from the at least one positional sensor, positional data for the serpentine body within the area as the serpentine body traverses the area;
    sensing an obstacle within the area under the flexible object; and elevating the front end of the serpentine body with a lifting force before the serpentine body contacts said obstacle to enable,
    the first portion and the second portion of the serpentine body to follow the front end over the obstacle, wherein the lifting force overcomes a combined weight of the front end and the flexible object.

2. A method in accordance with claim 1, wherein orienting the serpentine body further comprises elevating a front end of the serpentine body to a desired elevation.

3. A method in accordance with claim 1 further comprising:
    radially expanding the first portion; and
    radially contracting the second portion.

4. A method in accordance with claim 1 further comprising:
    axially expanding the first portion; and
    axially contracting the second portion.

5. A method in accordance with claim 1 further comprising using one of a mechanical system and a pneumatic system to actuate at least one of the first portion and the second portion.

6. A method in accordance with claim 1, wherein providing positional data comprises positioning the at least one positional sensor to provide conduct a nondestructive evaluation of the area.

7. A method in accordance with claim 1 further comprising using a friction mechanism to maintain a position of the first portion relative to a flexible object.

* * * * *

UNITED STATES PATENT AND TRADEMARK OFFICE
CERTIFICATE OF CORRECTION

PATENT NO. : 9,687,981 B2  
APPLICATION NO. : 14/536802  
DATED : June 27, 2017  
INVENTOR(S) : Hafenrichter et al.

Page 1 of 1

It is certified that error appears in the above-identified patent and that said Letters Patent is hereby corrected as shown below:

In the Claims

In Claim 1, Column 10, Lines 4-5, delete:
"said obstacle to enable,
the first portion"

And insert therefor:
--said obstacle to enable the first portion--.

Signed and Sealed this
First Day of May, 2018

Andrei Iancu
*Director of the United States Patent and Trademark Office*